United States Patent
Nava

[11] Patent Number: 5,969,056
[45] Date of Patent: Oct. 19, 1999

[54] PROCESS FOR PREPARING ESTERIFICATION PRODUCTS FROM CYCLIC ORGANIC CARBONATES USING CATALYSTS COMPRISING QUATERNARY AMMONIUM SALTS

[75] Inventor: Hildeberto Nava, Cary, N.C.

[73] Assignee: Reichhold, Inc., Research Triangle Park, N.C.

[21] Appl. No.: 09/231,229

[22] Filed: Jan. 14, 1999

[51] Int. Cl.$^6$ .............................. C08F 20/00; C08G 63/78
[52] U.S. Cl. ...................... 525/437; 528/176; 528/190; 528/193; 528/194; 528/275; 528/286; 528/297; 528/298; 525/444; 525/445
[58] Field of Search ................................ 528/275, 286, 528/297, 298, 176, 190, 193, 194; 525/437, 444, 445

[56] References Cited

U.S. PATENT DOCUMENTS

| | | | |
|---|---|---|---|
| 3,056,827 | 10/1962 | Windholz | 260/476 |
| 3,549,692 | 12/1970 | Bockmann et al. | 260/475 |
| 3,553,167 | 1/1971 | Schnell et al. | 260/47 |
| 3,896,090 | 7/1975 | Maximovich | 260/77.5 D |
| 4,107,143 | 8/1978 | Inata et al. | 528/176 |
| 4,216,298 | 8/1980 | Schreckenberg et al. | 525/439 |
| 4,217,297 | 8/1980 | Lindner et al. | 260/463 |
| 4,261,922 | 4/1981 | Kem | 260/512 R |
| 4,283,580 | 8/1981 | Odanaka et al. | 568/858 |
| 4,297,455 | 10/1981 | Lindner et al. | 525/439 |
| 4,306,056 | 12/1981 | Miyamoto et al. | 528/297 |
| 4,310,706 | 1/1982 | Strege | 568/648 |
| 4,310,707 | 1/1982 | Strege | 568/648 |
| 4,310,708 | 1/1982 | Strege et al. | 568/648 |
| 4,314,945 | 2/1982 | McMullen et al. | 260/340.2 |
| 4,341,905 | 7/1982 | Strege | 568/45 |
| 4,355,136 | 10/1982 | Dombroski et al. | 525/35 |
| 4,388,455 | 6/1983 | Bales | 528/176 |
| 4,423,205 | 12/1983 | Rajan | 528/371 |
| 4,440,937 | 4/1984 | Krimm et al. | 549/228 |
| 4,501,877 | 2/1985 | Fagerburg | 528/271 |
| 4,524,224 | 6/1985 | Taylor et al. | 568/858 |
| 4,556,748 | 12/1985 | Tsang et al. | 568/858 |
| 4,584,408 | 4/1986 | Wang et al. | 568/48 |
| 4,587,323 | 5/1986 | Toman | 528/66 |
| 4,613,678 | 9/1986 | Swart | 560/92 |
| 4,754,017 | 6/1988 | Leitz et al. | 528/371 |
| 4,758,606 | 7/1988 | Bentley et al. | 521/172 |
| 4,824,969 | 4/1989 | Austin et al. | 549/230 |
| 4,835,289 | 5/1989 | Brindopke | 549/229 |
| 4,877,886 | 10/1989 | Ream | 549/230 |
| 4,892,954 | 1/1990 | Brindopke et al. | 549/229 |
| 4,906,792 | 3/1990 | Heilmann et al. | 568/812 |
| 4,920,203 | 4/1990 | Tang et al. | 525/409 |
| 5,059,723 | 10/1991 | Dressler | 568/45 |
| 5,068,460 | 11/1991 | Sumner, Jr. et al. | 568/648 |
| 5,091,543 | 2/1992 | Grey | 549/228 |
| 5,102,976 | 4/1992 | Kressdorf et al. | 528/272 |
| 5,104,987 | 4/1992 | King | 544/401 |
| 5,157,159 | 10/1992 | Janulis et al. | 568/677 |
| 5,164,497 | 11/1992 | King et al. | 544/87 |
| 5,191,123 | 3/1993 | King | 564/507 |
| 5,210,322 | 5/1993 | King et al. | 568/579 |
| 5,218,135 | 6/1993 | Buysch et al. | 558/277 |
| 5,247,103 | 9/1993 | King et al. | 549/510 |
| 5,288,923 | 2/1994 | Fennhoff et al. | 568/640 |
| 5,304,628 | 4/1994 | Kinoshita et al. | 528/370 |
| 5,331,066 | 7/1994 | Takanoo et al. | 525/438 |
| 5,397,671 | 3/1995 | Bayley et al. | 430/109 |
| 5,407,772 | 4/1995 | Bayley et al. | 430/109 |
| 5,442,037 | 8/1995 | Lee et al. | 528/301 |
| 5,451,656 | 9/1995 | Menovcik et al. | 528/288 |
| 5,616,681 | 4/1997 | Itoh et al. | 528/279 |
| 5,679,871 | 10/1997 | Nava | 568/648 |
| 5,691,095 | 11/1997 | Shinzo et al. | 430/106 |
| 5,714,568 | 2/1998 | Nava | 528/196 |
| 5,731,380 | 3/1998 | Golder | 525/64 |
| 5,763,692 | 6/1998 | Kierkus et al. | 568/868 |

FOREIGN PATENT DOCUMENTS

| | | | |
|---|---|---|---|
| 0624609 A2 | 11/1994 | European Pat. Off. | |
| 322262 | 7/1957 | Switzerland . | |
| 707913 | 4/1954 | United Kingdom . | |
| WO 91/16292 | 10/1991 | WIPO | C07C 43/23 |

*Primary Examiner*—Samuel A. Acquah
*Attorney, Agent, or Firm*—Myers Bigel Sibley & Sajovec

[57] ABSTRACT

A process for the preparation of an esterification product comprises reacting a polyfunctional organic acid or anhydride and a cyclic organic carbonate compound in the presence of a catalyst to form an esterification product. The catalyst comprises a quaternary ammonium salt and a component selected from the group consisting of a metal, a salt of a metal, and mixtures thereof.

23 Claims, No Drawings

PROCESS FOR PREPARING ESTERIFICATION PRODUCTS FROM CYCLIC ORGANIC CARBONATES USING CATALYSTS COMPRISING QUATERNARY AMMONIUM SALTS

FIELD OF THE INVENTION

The present invention generally relates to processes for the preparation of esterification products. More specifically, the invention relates to processes for the preparation of esterification products using quaternary ammonium salts.

BACKGROUND OF THE INVENTION

Polyester-based resins, such as those formed from saturated and unsaturated polyesters, are utilized in a wide variety of end-use applications. The resins can be used, for example, in conjunction with other types of materials to form a composite. As an example, a prepreg is a composite consisting of fiber reinforcements placed within the resin, which is typically molded with pressure or vacuum to provide a variety of molded articles. Prepregs have applications in aerospace, transportation, appliances, sanitary ware, and the like. Polyester resins can also be diluted with organic solvents such as styrene to form laminating resins or gel coats. Typically, such resins are coated onto components which are used as panels forming the exterior bodies of vehicles, marine vessels, aircraft, and the like.

Traditional processes of forming saturated and unsaturated polyesters have involved the thermal dehydration of polyfunctional organic acids and alcohols, more particularly, dicarboxylic acids and diols. These processes, however, are disadvantageous in that long reaction times are involved, along with extreme processing conditions with respect to temperature and pressure. For example, such reactions occur at temperatures from 200° C. to 260° C. and pressures from 10 to 40 psi and can take from 20 to 40 hours.

Other efforts have focused on producing polyesters by reacting a carboxylic acid or anhydride with an organic carbonate, such as ethylene or propylene carbonate, in the presence of a catalyst. For example, U.S. Pat. No. 3,549,692 to Bockmann et al. proposes the reaction between an anhydride of a carboxylic acid and a cyclic carbonate of an alkylene glycol in the presence of imidazole catalysts. U.S. Pat. No. 4,613,678 to Swart proposes the esterification of aromatic dicarboxylic acids with cyclic alkylene carbonates in the presence of pyridine and pyridine-substituted catalysts. The products formed in these reactions are used in the preparation of polyesters.

The above catalysts, however, suffer from drawbacks. Specifically, the catalysts cause the esterification products to exhibit a high degree of undesired coloration which is aesthetically unpleasing. The products also are capable of forming highly-colored complexes when mixed with carboxylic acid and anhydride monomer in the preparation of saturated and unsaturated polyesters.

In response to the above shortcomings, U.S. Pat. No. 5,714,568 to Nava proposes preparing an esterification product by reacting a polyfunctional organic acid or anhydride, a cyclic organic carbonate, and a catalyst that may be an alkali metal, an alcohol-derived salt of an alkali metal, or mixtures thereof to form the esterification product. Although the '568 Nava patent potentially addresses the above-mentioned problems in the art, there remains a need to provide processes for preparing esterification products which exhibit improved reaction times relative to prior art processes.

In view of the above, it is an object of the present invention to provide processes for forming esterification products that are faster in comparison to conventional processes.

SUMMARY OF THE INVENTION

To these ends and others, the present invention provides a process for preparing an esterification product. The process comprises reacting a polyfunctional organic acid or anhydride and a cyclic organic carbonate compound in the presence of a catalyst to form an esterification product. The catalyst comprises a quaternary ammonium salt and a component selected from the group consisting of a metal, a salt of a metal, and mixtures thereof. Unexpectedly, Applicants have discovered that a mixture of the two catalyst components mentioned above provides a synergistic effect with respect to reaction time.

In another embodiment, the invention comprises a process for the preparation of a polyester resin. The process comprises reacting a polyfunctional organic acid or anhydride and a cyclic organic carbonate compound in the presence of a catalyst described herein to form an esterification product. The esterification product is then reacted with a compound selected from the group consisting of a monofunctional organic acid or anhydride, a polyfunctional organic acid or anhydride, and mixtures thereof to form the polyester resin.

DETAILED DESCRIPTION OF PREFERRED EMBODIMENTS

The invention will now be described in greater detail with respect to the preferred embodiments set forth herein below. It should be appreciated however that these embodiments are for illustrative purposes only, and that the scope of the invention is defined by the claims.

As summarized above, the present invention relates to a process for providing an esterification product. Specifically, the process includes reacting a polyfunctional organic acid or anhydride, a cyclic organic carbonate compound in the presence of a catalyst comprising: (1) a component selected from the group consisting of a metal, a salt of a metal, and mixtures thereof and (2) a quaternary ammonium salt, to form the esterification product.

The polyfunctional organic acid or anhydride which may be employed are any of the numerous and known compounds. Examples of polyfunctional organic acids or anhydrides are given in U.S. Pat. No. 5,714,568 to Nava, the disclosure of which is incorporated herein by reference in its entirety. Suitable polyfunctional acids or anhydrides thereof include, but are not limited to, maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, alkenyl succinic acids such as n-dodecenylsuccinic acid, docecylsucinic acid, octadecenylsuccinic acid, and anhydrides thereof. Lower alkyl esters of any of the above may also be employed. Mixtures of any of the above are suitable.

Numerous cyclic organic carbonate compounds may be used in the invention, including those described in U.S. Pat. No. 2,987,555 to Davis, the disclosure of which is incorporated herein by reference in its entirety. In general, suitable organic carbonate compounds include any cyclic alkylene carbonate having the appropriate carbonate moiety attached at adjacent positions capable of undergoing hydroxyalkylation with the phenolic or thiophenolic compounds. Particularly suitable cyclic organic carbonates are of the general formula:

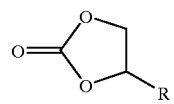

where R is selected from the group consisting of H, $C_1$–$C_{18}$ alkyl, $C_1$–$C_{20}$ alkoxy, alkoxyalkylene, (poly) alkoxyalkylene, and aryl. Specific examples of cyclic organic carbonates include, but are not limited to, propylene carbonate, 1,2- and 2,3-butylene carbonate, and phenylethylene carbonate. Mixtures of any of the above compounds may be employed. The cyclic organic carbonate may be employed in any suitable amount in the process.

The catalyst which is to be employed in the esterification reaction comprises: (1) a component selected from the group consisting of a metal, a salt of a metal, and mixtures thereof and (2) a quaternary ammonium salt. Examples of metals that can be used in the catalyst are described in U.S. Pat. Nos. 5,104,987; 5,191,123; and 5,210,322, the disclosures of which are incorporated herein by reference in its entirety.

The metals which may be used are to be selected from a broad range of compounds and alloys thereof known to one skilled in the art. Examples of metals include, but are not limited to, those in Group IA, Group IIA, Group IIB (including lanthanides and actinides), Group IVB, Group VB, Group VIB, Group VIIB, Group VIII, Group IB, Group IIB, Group IIIA, Group IVA. and Group VA, and Group IIIB. The metal may be utilized in substantially pure form. For the purposes of the invention, the metal being present in "substantially pure form" relates to a metal existing as an uncombined chemical element.

A salt of a metal may also be employed and is to include any number of salts that may form with metals. Examples of salts include, but are not limited to, alcohol-derived salts, phenoxy salts, organic acid salts, hydroxides, halogen-containing salts, and alkoxides. Preferred salts are alcohol-derived salts include, for example, methoxide and ethoxide salts.

The quaternary ammonium salt that is employed may be selected from a variety of compounds such as, but not limited to, quaternary ammonium halide salts. Examples include tetramethylammonium chloride, tetramethylammonium bromide, benzyltrimethylammonium chloride, benzyltrimethylammonium bromide, benzyltributylammonium chloride, and benzyltrimethylammonium bromide. Other salts which may be employed include, but are not limited to, tetramethylammonium hydroxide, tetramethylammonium hydrogen sulfate, benzyltrimethylammonium hydrogen sulfate, and benzyltributylammonium hydrogen sulfate.

The quaternary ammonium salt may be used in various amounts. Preferably, the salt in an amount ranging from about 0.0005 to about 4.0 percent based on the weight of the reactive components used in the process.

The catalyst may comprise other components such as, but not limited to, phosphorous-containing compounds such as, for example, triorgano phosphine compounds (e.g., triphenyl phosphine, tributyl phosphine, iphenylbutyl phosphine, and dibutyl phosphine); and phosphonium salts e.g., tetraphenyl phosphonium bromide, tetraphenyl phosphonium acetate, tetrabutyl phosphonium bromide, tetrabutyl phosphonium acetate). Imidazoles (e.g., imidazole, 2-methylimidazole, N-(2'-hydroxyethyl)-2-methylimidazole, piperidine, morpholine, triethylamine) may also be used along with tertiary amine compounds and their salts (e.g., triethyl amine and tributyl amine); and organometallic salts (e.g., zinc octoate, magnesium octoate, zirconium hexanoate).

The total quantity of catalyst may be used in various amounts in the process. Typically as is known to one skilled in the art, this amount will vary depending on the type of polyfunctional organic acid or anhydride, cyclic organic carbonate, and catalyst used. Reaction conditions such as temperature and pressure also may influence catalyst amount. The amount of catalyst is preferably between about 0.0005 and 5 percent by weight based on the total amount of reacting components. More preferably, the catalyst amount will be between about 0.005 to 3 percent by weight.

Additional components which are known to be useful in esterification reactions may be utilized in the process. As an example, the reaction may take place in the presence of an appropriate inert solvent such as, for example, toluene, xylene, cyclohexane, tetrahydronaphthalene, naphthalene, anisole, and chlorobenzene. The use of a solvent will typically depend on its properties and on the types of polyfunctional organic acid or anhydride, cyclic organic carbonate, and catalyst used. Typically, the addition of a solvent is not necessary for carrying out the reaction.

The process may be carried out using various molar ratios of the cyclic organic carbonate compound to the polyfunctional organic acid or anhydride. Preferably, the cyclic organic carbonate may be added in an amount from about 1.00 to 1.50 moles per every mole of polyfunctional organic acid or anhydride, and more preferably from about 1.00 to 1.05 per every mole of polyfunctional organic acid or anhydride.

The process of the invention may be carried out in any known and suitable vessel which is designed to contain the reactants and products, including those described in U.S. Pat. No. 4,310,708 to Strege et al., the disclosure of which is incorporated herein by reference in its entirety. Preferably, the materials of the vessel are inert under the conditions employed during the process. Such materials may include glass, stainless steel, and the like.

The reaction may be run at any suitable temperature, preferably from about 60° C. to about 250° C., and more preferably from about 100° C. to about 220° C. Although not wishing to be bound by any theories, it is believed that the reaction rate of the esterification reaction may be temperature dependent. Accordingly, the optimum operating temperature for any reaction may be determined by the skilled artisan through experimentation. Heating of the reaction vessel to the operating temperature may be achieved by any suitable heating means such as a heat lamp, heating mantle, oil bath, and the like.

The reaction time to obtain adequate conversion of the polyfunctional organic acid or anhydride will typically vary depending on various factors such as, for example, temperature, catalyst type, and type of polyfunctional organic acid or anhydride and cyclic organic carbonate. Generally, the time which is sufficient for the reaction to take place is when an acid number of from about 0.0 to about 20 is achieved, usually from about 2 to about 20 hours, and more preferably from about 4 to about 12 hours.

Additional means may be employed to facilitate the reaction of the polyfunctional organic acid or anhydride and the cyclic organic carbonate. For example, the reaction may proceed with or without stirring by mechanical, magnetic, or other known means.

The esterification product produced in accordance with the invention may be used as is or may be purified by any of the well known techniques including fractional distillation or crystallization.

In another embodiment, the process of the present invention includes the additional step of reacting the esterification product with a compound selected from the group consisting of a monofunctional organic acid, a polyfunctional organic acid or anhydride, and mixtures thereof to form a polyester resin. Additionally, an alcohol or a hydroxyalkyl derivative of a phenol may be reacted with the esterification product and the compound selected from the group consisting of a monofunctional organic acid, a polyfunctional organic acid or anhydride, and mixtures thereof to form the polyester resin. Any known and suitable polyester resins may be formed from the esterification product of the present invention. For example, branched and linear polyesters of varying molecular weights may be formed. The components (e.g., acids, anhydrides, alcohols, and hydroxyalkyl derivatives of phenols) which are suitable in forming these various polyesters are well known to the skilled artisan. Any of the known and appropriate processes can be employed in producing the polyester resin.

Any of the appropriate monofunctional organic acids may be used in forming the polyester resin. These compounds include, for example, acrylic acid, methacrylic acid, crotonic acid, cinnamic acid, sorbic acid, and benzoic acid. Mixtures of any of the above may be employed. Preferably, the monofunctional organic acid is employed in an amount ranging from about 20 to about 60 percent based on the weight of the polyester resin.

Suitable polyfunctional organic acids or anhydrides include, but are not limited to, those disclosed herein. Preferably, the polyfunctional organic acid or anhydride is used in an amount ranging from about 30 to 60 percent based on the weight of the polyester resin.

Any alcohols which are appropriate in polyester-forming reactions may be utilized. Such compounds include, but are not limited to, ethylene glycol, propylene glycol, diethylene glycol, neopentyl glycol, dipropylene glycol, polytetramethylene glycol, 1,5-pentanediol, 1,4-butanediol, 1,6-hexanediol, 1,4-cyclohexanediol, 1,4-cyclohexanedimethanol, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl propanetriol, 2-methyl 1,2,4-butanetriol, trimethylol ethane, trimethylol propane, and 1.3.5-trihydroxyethyl benzene. Mixtures of any of the above may be used.

The hydroxyalkyl phenol derivatives may be produced utilizing any appropriate processes and starting materials. For example, the derivatives may be formed by the reaction between a phenol and an organic oxide such as ethylene oxide or propylene oxide, or from the reaction between a phenol and a cyclic organic carbonate such as described in U.S. Pat. Nos. 4,310,708 to Strenge et al.; 5,059,723 to Dressler; and 5,679,871 to Nava, the disclosures of which are incorporated herein by reference in their entirety. Phenols which may be used in the polyester-forming reaction are well known and include all appropriate mono- and polyhydric phenols. Examples of monohydric phenols which may be hydroxylated generally include phenol, β-naphthol, o-chloro phenol, o-cresol, p-propyl phenol, p-bis(o-cresol), phenyl phenol, nonyl phenol, mono-, di-, and tri-alkyl phenols, $C_1$ to $C_{18}$ substituted phenols, polyaralkylphenols, halophenols, arylphenols, naphthols and hydroxyquinoline. Examples of some useful polyhydric phenols which may be hydroxylated include catechol; resorcinol; hydroquinone; 4,4'-biphenol; 4,4'-isopropyllidenebis (o-cresol); 4,4'-isopropylidenebis(2-phenyl phenol); alkylidenediphenols such as bisphenol A, pyrogallol, and phloroglucinol. Mixtures of any of the above may be used. Exemplary phenol derivatives include hydroxyethyl and hydroxypropyl derivatives.

The alcohols and hydroxyalkyl derivatives of phenols may be used in any suitable amount, preferably from about 35 to about 65 percent based on the weight of the polyester resin.

The formation of the polyester resin can be facilitated by employing a curing agent which includes any of the known peroxides and curing accelerators, promoters, or initiators.

Suitable peroxides include, for example, cumene hydroperoxide, methyl ethyl ketone peroxide, benzoyl peroxide, acetyl acetone peroxide, 2,5-dimethylhexane-2,5-dihydroperoxide, tert-butyl peroxybenzoate, di-tert-butyl perphthalate, dicumylperoxide, 2,5-dimethyl-2,5-bis(tert-butylperoxy)hexane, 2,5-dimethyl-2,5-bis (tert-butylperoxy) hexyne 3, bis (tert-butylperoxyisopropyl) benzene di-tert-butyl peroxide, 1,1-di (tert-amylperoxy)-cyclohexane, 1,1-di-(tert-butylperoxy)-3,3,5-trymethylcyclohexane, 1,1-di-(tert-butylperoxy)-cyclohexane, 2,2-di-(tert-butylperoxy)-butane, n-butyl 4,4-di-(tert-butylperoxy)-valerate, ethyl 3,3-di-(tert-amylperoxy)-butyrate, ethyl 3,3-di-(tert-butylperoxy)-butyrate and the like. Mixtures of any of the above may be used. The peroxide is preferably employed in an amount from about 1 to 2.5 percent based on the weight of the polyester resin, more preferably from about 1 to about 1.5 percent by weight, and most preferably from about 1 to about 1.25 percent by weight.

Suitable curing accelerators or promoters include, for example, cobalt naphthanate, cobalt otoate, N,N-dimethyl aniline, N,N-dimethyl acetamide, and N,N-dimethyl para-toluidine. Mixtures of the above may be used. The curing accelerators or promoters are preferably employed in amounts from about 0.05 to 1.0 percent by weight, more preferably from about 0.1 to about 0.5 percent by weight, and most preferably from about 0.1 to about 0.3 percent by weight of the polyester resin.

Suitable initiators include those which are known in the art such as, for example, free radical initiators. Examples of free radical initiators include nitrogen-containing compounds such as, but not limited to, azo compouds. Examples of azo compounds include 2,2'-azobis(2-methylpropanenitrile), 2,2'-azobis(2,4-dimethylpentanenitrile), 2,2'-azobis(2-methylbutanenitrile), 1,1'-azobis(cyclohexanecarbonitrile), 4,4'-azobis(4-cyanopentanoic acid), and 2,2'-azobis[2-methyl-N-(2-hydroxyethyl) propionamide]. Other initiators such as UV-initiators may also be used. Mixtures of any of the above may be employed by the skilled artisan.

The polyester resin can be incorporated with any number of other suitable components so as to be useful in a wide variety of applications. For example, the polyester can be combined with various vinyl ester resins, aliphatic conjugated dienes, non-aromatic unsaturated mono- or dicarboxylic ester monomers, and/or aromatic unsaturated monomers so as to form a solid product useful as a toner resin, a powder coating, or a binder. Moreover, the polyester resin may be employed as a curable thermosetting resin useful for forming molded or shaped articles which require desirable hardness, elongation, toughness, and corrosion resistance properties along with high heat resistance. The polyester resin may be used with any appropriate fibrous reinforcing material to form pre-pregs. Any of the known processes may be used to form the pre-pregs including, for example, pultrusion.

Moreover, the polyester resin can be combined with known and suitable monomeric components to form a liquid resin such as a laminating resin or a gel coat resin for coating on a suitable substrate. The substrate may be part of an article of manufacture such as, for example, a marine vessel, a vehicle, or an aircraft.

Vinyl monomers may be used in forming the liquid resin including those such as, for example, styrene and styrene derivatives such as alphamethylstyrene, para methyl styrene, isopropyl styrene, divinyl benzene, divinyl toluene, ethyl styrene, vinyl toluene, tert-butyl styrene, monochlorostyrene, dichlorostyrene, vinyl benzyl chloride, fluorostyrene, and alkoxystyrenes (e.g., paramethoxystyrene). Other monomers which may be used include, for example, diallyl phthalate, hexyl acrylate, octyl acrylate, octyl methacrylate, diallyl itaconate, diallyl maleate, hydroxyethyl acrylate, hydroxyethyl methacrylate, hydroxypropyl acrylate, and hydroxypropyl methacrylate. The vinyl monomer which may be employed can be any appropriate polyfunctional acrylate, including those described, for example, in U.S. Pat. No. 4,916,023 to Kawabata et al., the disclosure of which is incorporated by reference herein in its entirety. Such compounds include hydroxypropyl methacrylate, hydroxyethyl methacrylate, and the like. The polyfunctional acrylate which may be used in the present invention can be represented by the general formula:

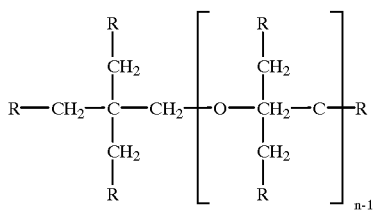

wherein at least four of the represented R's present are (meth)acryloxy groups, with the remainder of the R's being an organic group except (meth)acryloxy groups, and n is an integer from 1 to 5. Examples of polyfunctional acrylates include ethoxylated trimethyolpropane triacrylate, trimethyolpropane tri(meth)acrylate, trimethyolpropane triacrylate, trimethylolmethane tetra(meth)acrylate, pentaerythritol tetra(meth)acrylate, dipentaerythritol tetra(meth)acrylate, dipentaerythritol penta(meth)acrylate, and dipentaerythritol hexa(meth)acrylate. Mixtures of any of the above may be used in conjunction with the polyester resin. The vinyl monomers may be employed in any amount, preferably from about 3 to 10 percent based on the weight of the polyester resin.

The following examples are provided to illustrate the present invention, and should not be construed as limiting thereof.

EXAMPLE 1

To a reactor equipped with a stirrer, heating mantle, fractionating column and a condenser, were added 172.2 lbs. of propylene carbonate, 136.7 lbs. of terephthalic acid, 140.2 grams of tetramethyl ammonium chloride and 92 grams of sodium methylate (25% methanolic solution). The reaction was performed between 180° C. and 200° C. by evolution of $CO_2$ until an acid number of less than one of the solid intermediate was achieved. At an acid number of less than one, the temperature was decreased to 190° C. and 7.39 grams of hydroquinone, 18.5 grams of phosphorus acid, 13.5 lbs. of propylene glycol and 80.79 pounds of maleic anhydride were added. The reaction was continued at 225° C. until an acid number of 3.6 was obtained in the solid product. The resulting product was diluted with 137 lbs. of styrene containing 2.4 grams of hydroquinone and 3.7 grams of methyl tert-butyl hydroquinone.

EXAMPLE 2

To a reactor equipped with a stirrer, heating mantle, franctionating column and a condenser, were added 117.9 lbs. of propylene carbonate, 94.50 lbs. of terephthalic acid, 96.25 grams of tetramethyl ammonium chloride and 64.4 grams of sodium methylate (25% methanolic solution). The reaction was performed between 180° C. and 200° C. by evolution of $CO_2$ until an acid number of less than one of the solid intermediate was achieved. At an acid number of less than one, the temperature was decreased to 190° C. and 6.8 grams of hydroquinone, 17.4 grams of phosphorus acid, 55.5 lbs. of propylene glycol and 111.8 pounds of maleic anhydride were added. The reaction was continued at 225° C. until an acid number of 20.5 was obtained in the solid product. The resulting product was diluted with 152 lbs. of styrene containing 4.5 grams of hydroquinone and 9.1 grams of methyl tert-butyl hydroquinone.

EXAMPLE 3

To a reactor equipped with a stirrer, heating mantle, fractionating column and a condenser, were added 132.9 grams of ethylene carbonate, 153.2 grams of propylene carbonate, 195.5 grams of ethylene glycol, 747.9 grams of terephthalic acid, 1.79 grams of tetramethyl ammonium chloride and 0.55 grams of Fascat 4100 (hydrated monobutyltil oxide from Elf Atochem located in King of Prussia, Pa.). The reaction was performed between 180° C. and 200° C. by evolution of $CO_2$ and water formation until an acid number of less than three of the solid intermediate was achieved. At an acid number of less than three, the temperature was decreased to 190° C. and 0.06 grams of hydroquinone, 0.28 grams of triphenyl phosphite, 34.4 grams of trimethylol propane and 147.2 grams of maleic anhydride were added. The reaction was continued at 227° C. until an ICI Cone and Plate Viscosity of about 100 poise at 200° C. was obtained. The resulting solid product had a melt index of 8.31 at 125° C. and a $T_g$ of 56° C.

EXAMPLE 4

To a reactor equipped with a stirrer, heating mantle, fractionating column and a condenser, were added 255.3 grams of propylene carbonate, 209.0 grams of propylene glycol, 415.5 grams of terephthalic acid, 1.14 grams of tetramethyl ammonium chloride, 0.70 grams of Fascat 4100, and 0.88 grams of Doverphos S-9228 (bis(2,4-dicumylphenyl)pentaerythrytol diphosphite, sold by Dover Chemical). The reaction was performed between 180° C. and 200° C. by evolution of $CO_2$ and water formation until an acid number of less than one of the solid intermediate was achieved. At an acid number of less than one, the temperature was decreased to 190° C. and 0.50 grams of hydroquinone, 0.23 grams of phosphorus acid, and 245.3 grams of maleic anhydride were added. The reaction was continued at 220° C. until an acid number of 17.3 was obtained in the solid product. The resulting product was diluted with 371.4 grams of styrene containing 0.03 grams of hydroquinone and 0.045 grams of methyl tert-butyl hydroquinone. The resulting mixture had a Brookfield Viscosity at room temperature of 2680 cps measured with spindle #4 at 20 rpm.

EXAMPLE 5

To a reactor equipped with a stirrer, heating mantle, fractionating column and a condenser, were added 82.0 lbs.

of propylene carbonate, 73 lbs. of propylene glycol, 133 lbs. of terephthalic acid, 219.2 grams of tetramethyl ammonium chloride, 137.0 grams of sodium methylate, and 219.2 grams of Doverphos S-680 (distearyl pentaerythrytol diphosphite from Dover Chemical). The reaction was performed between 180° C. and 200° C. by evolution of $CO_2$ and water formation until an acid number of less than one of the solid intermediate was achieved. At an acid number of less than one, the temperature was decreased to 190° C. and 7.70 grams of hydroquinone, 219.2 grams of Doverphos S-680, and 79.0 lbs. of maleic anhydride were added. The reaction was continued at 220° C. until an acid number of 5.8 was obtained in the solid product. The resulting product was diluted with 150 lbs. of styrene containing 2.80 grams of hydroquinone and 4.40 grams of methyl tert-butyl hydroquinone. The resulting mixture had a Brookfield Viscosity at room temperature of 2420 cps measured with spindle #4 at 20 rpm at 60.5% solids.

EXAMPLE 6

To a reactor equipped with a stirrer, heating mantle, fractionating column and a condenser, were added 116.8 lbs. of propylene carbonate, 101.6 lbs. of propylene glycol, 190.1 lbs. of terephthalic acid, 453.0 grams of tetramethyl ammonium chloride, 283.1 grams of sodium methylate, and 453.0 grams of Doverphos S-680 (distearyl pentaerythrytol diphosphite from Dover Chemical). The reaction was performed between 180° C. and 200° C. by evolution of $CO_2$ and water formation until an acid number of less than one of the solid intermediate was achieved. At an acid number of less than one, the temperature was decreased to 190° C. and 18.1 grams of hydroquinone, 453.0 grams of Doverphos S-680, 4.53 grams of phosphorous acid, 101.5 lbs. of propylene glycol and 227.8 lbs. of maleic anhydride were added. The reaction was continued at 225° C. until an acid number of 18 was obtained in the solid product. The resulting product was diluted with 320 lbs. of styrene containing 22.6 grams of hydroquinone and 9.0 grams of methyl tert-butyl hydroquinone. The resulting mixture had a Brookfield Viscosity at room temperature of 2600 cps measured with spindle #4 at 20 rpm at 65.0% solids.

Physical properties for select resins are given in Table 1. As seen, the resins generally exhibit a desirable combination of properties.

TABLE 1

PHYSICAL PROPERTIES

| Property | Example 1 | 2 | 5 | 6 |
|---|---|---|---|---|
| Barcol Hardness | 57–60 | 57–59 | 39–45 | 41–45 |
| HDT, C | 108 | 120 | 126 | — |
| Flex. Strength, Psi | 18,540 | 15,940 | 14,650 | 17,830 |
| Flex. Mod. Psi. E6 | 5.10 | 5.35 | 5.43 | 5.26 |
| Ten. Strength, Psi. | 9,550 | 8,645 | 8,000 | 10,340 |
| Ten. Mod. Psi. E6 | 5.00 | 5.20 | 5.00 | 4.97 |
| % Elongation | 2.35 | 1.95 | 1.83 | 2.52 |

The invention has been described in detail with reference to its preferred embodiments and its example. However, it will be apparent that numerous variations and modifications can be made without departure from the spirit and scope of the invention as described in the foregoing detailed specification and claims.

What is claimed is:

1. In a process for the preparation of an esterification product wherein a polyfunctional organic acid or anhydride and a cyclic organic carbonate compound are reacted in the presence of a catalyst selected from the group consisting of a metal, a salt of a metal, and mixtures thereof, the improvement comprises reacting the polyfunctional organic acid or anhydride and the cyclic organic carbonate in the presence of a quaternary ammonium salt.

2. The process according to claim 1, wherein the quaternary ammonium salt is selected from the group consisting of tetramethyl ammonium chloride, tetramethylammonium hydroxide, tetramethylammonium bromide, and mixtures thereof.

3. The process according to claim 1, wherein the quaternary ammonium salt is present in an amount ranging from about 0.0005 to about 4.0 percent based on the weight of the reactive components.

4. The process according to claim 1, wherein the salt of the metal is an alcohol-derived salt.

5. The process according to claim 4, wherein the alcohol-derived salt is a methoxide or ethoxide salt.

6. The process according to claim 1 wherein the cyclic organic carbonate compound is selected from the group consisting of propylene carbonate, 1,2-butylene carbonate, 2,3-butylene carbonate, phenylethylene carbonate, and mixtures thereof.

7. The process according to claim 1, wherein the catalyst further comprises a phosphorous-containing compound.

8. A process for the preparation of an esterification product comprising:
    reacting a polyfunctional organic acid or anhydride and a cyclic organic carbonate compound in the presence of a catalyst to form an esterification product, the catalyst comprising a quaternary ammonium salt and a component selected from the group consisting of a metal, a salt of a metal, and mixtures thereof.

9. The process according to claim 8, wherein the quaternary ammonium salt is selected from the group consisting of tetramethyl ammonium chloride, tetramethylammonium hydroxide, tetramethylammonium bromide, and mixtures thereof.

10. The process according to claim 8, wherein the quaternary ammonium salt is present in an amount ranging from about 0.0005 to about 4.0 based on the weight of the reactive components.

11. The process according to claim 8, wherein the salt of a metal is an alcohol-derived salt.

12. The process according to claim 11 wherein the alcohol-derived salt is a methoxide or ethoxide salt.

13. The process according to claim 11 wherein the cyclic organic carbonate compound is selected from the group consisting of propylene carbonate, 1,2-butylene carbonate, 2,3-butylene carbonate, phenylethylene carbonate, and mixtures thereof.

14. The process according to claim 11, wherein the catalyst further comprises a phosphorous-containing compound.

15. A process for the preparation of a polyester resin comprising:
    reacting a polyfunctional organic acid or anhydride and a cyclic organic carbonate compound in the presence of a catalyst to form an esterification product, the catalyst comprising a quaternary ammonium salt and a component selected from the group consisting of a metal, a salt of a metal, and mixtures thereof; and
    reacting the esterification product with a compound selected from the group consisting of a monofunctional organic acid or anhydride, a polyfunctional organic acid or anhydride, and mixtures thereof to form the polyester resin.

16. The process according to claim 15, wherein the quaternary ammonium salt is selected from the group consisting of tetramethyl ammonium chloride, tetramethylammonium hydroxide, tetramethylammonium bromide, and mixtures thereof.

17. The process according to claim 15, wherein the quaternary ammonium salt is present in an amount ranging from about 0.0005 to about 4.0 based on the weight of the reactive components.

18. The process according to claim 15, wherein the salt of a metal is an alcohol-derived salt.

19. The process according to claim 18 wherein the alcohol-derived salt of the alkali metal is a methoxide or ethoxide salt.

20. The process according to claim 15 wherein the cyclic organic carbonate compound is selected from the group consisting of propylene carbonate, 1,2-butylene carbonate, 2,3-butylene carbonate, phenylethylene carbonate, and mixtures thereof.

21. The process according to claim 15 wherein an alcohol or a hydroxyalkyl derivative of a phenol is reacted with the esterification product and the compound selected from the group consisting of a monofunctional organic acid or anhydride, a polyfunctional organic acid or anhydride, and mixtures thereof to form the polyester resin.

22. The process according to claim 15, further comprising the step of combining the polyester resin with a monomeric component to form a liquid resin.

23. The process according to claim 15, wherein the catalyst further comprises a phosphorous-containing compound.

* * * * *